April 14, 1931.   K. M. HAMILTON   1,801,234
RAILWAY CAR TRUCK
Filed March 8, 1929   2 Sheets-Sheet 1

INVENTOR
Karl M. Hamilton
BY Evans & McCoy
ATTORNEYS

April 14, 1931.  K. M. HAMILTON  1,801,234
RAILWAY CAR TRUCK
Filed March 8, 1929  2 Sheets-Sheet 2
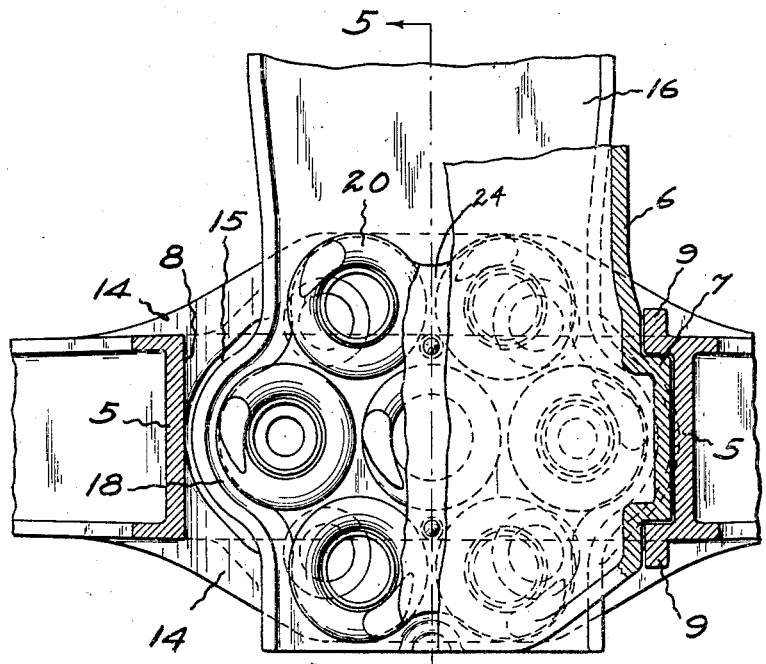
Fig. 4.
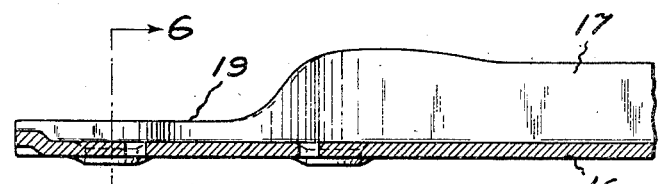
Fig. 5.
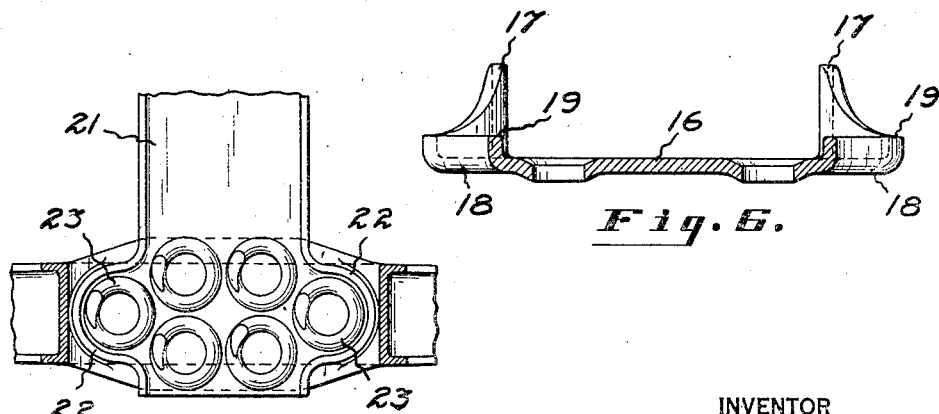
Fig. 6.
Fig. 7.
INVENTOR
Karl M. Hamilton
BY
Evans & McCoy
ATTORNEYS Patented Apr. 14, 1931

1,801,234

UNITED STATES PATENT OFFICE

KARL M. HAMILTON, OF CHICAGO, ILLINOIS, ASSIGNOR TO THE BETTENDORF COMPANY, OF BETTENDORF, IOWA, A CORPORATION OF IOWA

RAILWAY-CAR TRUCK

Application filed March 8, 1929. Serial No. 345,305.

This invention relates to railway car trucks and more particularly to the construction of the side frames and the mounting of the bolster, spring plank and bolster supporting springs in the side frames.

The invention has for an object to provide a side frame construction in which the spring seating portion of the tension chord is effectively reinforced to provide ample strength to enable the side frames to bear the load imposed thereon through the bolster springs without distortion and further to provide a side frame which is so constructed as to permit a compact nesting of the bolster supporting springs with the spring nest centered with respect to the side frames and with all of the springs supported on the tension chord at the same level.

A further object is to provide a truck in which the side frames are so constructed as to permit a compact nesting of the supporting springs whereby a greater number of springs may be employed in a truck of a given wheel base and in which the springs occupy a minimum space longitudinally of the frame and transversely thereof.

A further object is to provide a side frame in which a bolster opening is provided between upright columns connecting the compression and tension chords, in which the portion of the tension chord between the columns is formed to provide a flat spring support extending from one column to the other so that the entire space between the columns may be utilized to receive a nest of bolster supporting springs and in which the tension chord is effectually strengthened by diagonally disposed reinforcing webs at opposite sides of the flat spring supporting portion.

A further object is to provide a spring plank which is formed with flat widened end portions which serve as spring seats and which are formed to interlock with the side frames, the widened portions of the spring plank fitting in the recess between the reinforcing webs, the narrow body portion of the spring plank providing space for the brake beams so that a relatively large number of springs may be employed in a truck having a relatively short wheel base.

A further object is to provide a spring plank which has a central portion which is relatively narrow and of channel form with relatively deep flanges and which has widened spring seating portions at the ends thereof provided with relatively low side flanges so that the insertion or removal of bolster supporting springs is facilitated.

A further object is to provide a side frame in which the full width of the bolster opening may be utilized for bolster supporting springs and in which guides are provided for the bolster which effectively hold the bolster against lateral, endwise and turning movements in the side frame.

A further object is to provide a truck having side frames with relatively wide bolster openings adapted to accommodate a relatively long nest of bolster supporting springs and to provide bolster guiding means which does not interfere with the proper positioning of the brake hanger brackets.

With the above and other objects in view, the invention may be said to comprise the truck as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of the specification in which:

Fig. 4 is a horizontal section taken on the line indicated at 4—4 in Fig. 2.

Fig. 5 is a fragmentary longitudinal section through an end portion of the spring plank taken on the line indicated at 5—5 in Fig. 4.

Fig. 6 is a transverse section taken on the line indicated at 6—6 in Fig. 5.

Fig. 7 is a sectional view similar to Fig. 4 showing a modified spring arrangement.

Figure 1:
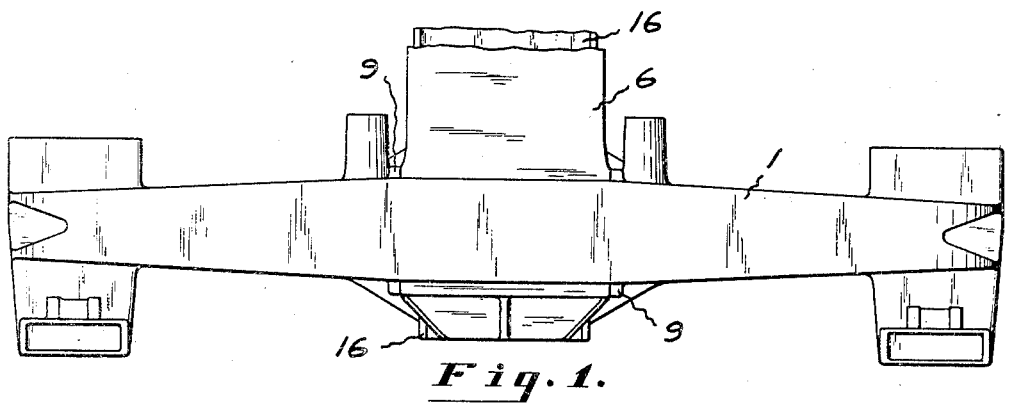
Figure 1 is a fragmentary top plan view showing the side frame, bolster and spring plank assembly.

Referring to the accompanying drawings, the truck is provided with side frames each of which may be in the form of a one piece casting, each having a compression chord 1 and a tension chord 2, the tension chord having a central horizontal spring supporting portion 3 and inclined end portions 4 which join the horizontal portion 3 to the ends of the compression chord 1. At each end of the horizontal portion 3, the tension chord is connected to the compression chord by an integral upright column 5, the columns 5 being spaced apart a sufficient distance to form a bolster receiving opening between them. The ends of a suitable bolster 6 extend into the bolster receiving opening between the columns 5 and the bolster is provided adjacent its ends with lateral projections 7 which bear against the flat inner faces 8 of the columns 5.

The upper portion of each of the columns 5 is provided with inwardly extending guide flanges 9 which provide channels to receive the projection 7 of the bolster and these flanges terminate a sufficient distance above the bottom of the bolster receiving opening to provide an enlargement 10 in the lower portion of the bolster receiving opening of sufficient width and depth to permit the enlarged end of the bolster to be inserted in the opening beneath the guide flanges 9 and to be lifted into interlocking engagement with the guide flanges 9. The projections 7 of the bolster have relatively wide flat faces adapted to bear against the flat faces 8 of the guide columns so that in all positions of the bolster within the bolster receiving openings, the bolster is rigidly held against movements bodily in a lateral direction and against turning movements. In addition, the guide flanges 9 engaging opposite edges of the projection 7 positively hold the bolster against endwise movements.

The horizontal portion 3 of the tension chord has a flat web 11 extending across the top thereof and projecting laterally beyond the opposite sides of the body portion of the chord forming horizontal side flanges 12 which provide a relatively wide spring support immediately beneath the end of the bolster. The flanges 12 are reinforced by vertical webs 13 which connect the under sides of the flanges with the body of the tension chord. The flat web 11 extends from the base of one column 5 to the base of the other so that a relatively wide flat spring support is provided along the center line of the side frame.

The provision of a relatively long horizontal spring supporting portion in the tension chord tends to weaken the tension chord since the load imposed through the supporting springs tends to cause the tension member to assume the shape which would be assumed by a flexible tension member supported at the ends of the compression chord and subjected to a similar load. The tension chord has a weak point at the juncture of the horizontal portion with the columns 5 and inclined end portions 4 of the tension chord and, in order to effectively strengthen these portions of the tension chord, reinforcing webs 14 extend across the lower corners of the bolster receiving opening, these webs merging into the flanges 12 at points spaced inwardly from the columns 5 and extending upwardly from the flanges 12 and merging into the frame at or near the junction of the tension chord and the columns 5. The webs 14 are formed with outer portions forming continuations of the flanges 12 and with inner portions curved inwardly across the faces 8 of the columns 5 toward the center and forming rounded recess 15 above the web 11 at the base of each of the columns.

It will be seen, therefore, that by the arrangement of the web 14, the greatest length of the spring seat may be obtained substantially along the longitudinal center line of the side frame.

A spring plank 16 connects the horizontal portions 3 of the opposite side frames and the spring plank is of channel form having relatively deep side flanges 17. The bottom or web of the channel shaped spring plank is preferably flat and is widened at each end to provide rounded lateral projections 18 which are of a size and shape to substantially fit in the rounded recesses 15 at opposite sides of the bolster opening.

The side flanges of the spring plank are continuous from one end of the spring plank to the other, but at the ends of the spring plank, the portions 19 of the flange extending along the edges of the projections 18 and to the end of the spring plank are relatively low so that in assembling the truck, the springs may be easily inserted between the spring plank and bolster and so that when the truck is in service, the removal and replacement of bolster supporting spring group as a unit is facilitated.

The lateral projections 18 of the spring plank are each of a size and shape to accommodate one of the bolster supporting springs 20 so that the end springs of the group or nest of springs may be positioned in close proximity to the columns 5 and supported at the same level as the other springs of the group. The width of the bolster opening may be varied to provide a seat for as many springs as desirable for the particular truck for which the side frame is designed and the springs may be arranged with a central row extending centrally of the side frame and with additional springs positioned on opposite sides of the central row and resting upon the flanges 12 as shown in Fig. 4.

In Fig. 7 of the drawing, there is shown a slightly modified construction in which a spring plank 21 is provided with rounded lateral projections 22 which interlock with the reinforcing webs of the side frame having substantially the same construction as the side frame shown in Figs. 1 to 4 except that the bolster opening is somewhat wider.

In this modification, the end springs 23 of the group are positioned in the extensions 22 closely adjacent the guide columns and the remaining springs of the group are nested between the end springs 23.

It will be obvious that various groupings of springs may be employed and that the present invention permits the use of a relatively large number of bolster supporting springs which are all of uniform length and through which the load is transmitted uniformly to the side frames.

It will further be evident that the bolster guiding means provided permits the bolster to have vertical movements, but rigidly holds the bolster against endwise, lateral and turning movements and that the bolster is effectively guided by reason of its full engagement with the flat inner faces of the guide columns.

It will also be apparent that the present invention provides a side frame designed to support a relatively large number of bolster springs of uniform length which is effectually reinforced against distortion under heavy loads imposed thereon through the supporting springs.

It should also be noted that the bolster guiding means permits suspension of the brake beams from points closely adjacent the bolster receiving opening and that the narrow bolster provides space for the brake beams closely adjacent the center of the truck so that the number of bolster supporting springs may be increased without an increase in the length of the wheel base.

Figure 2:
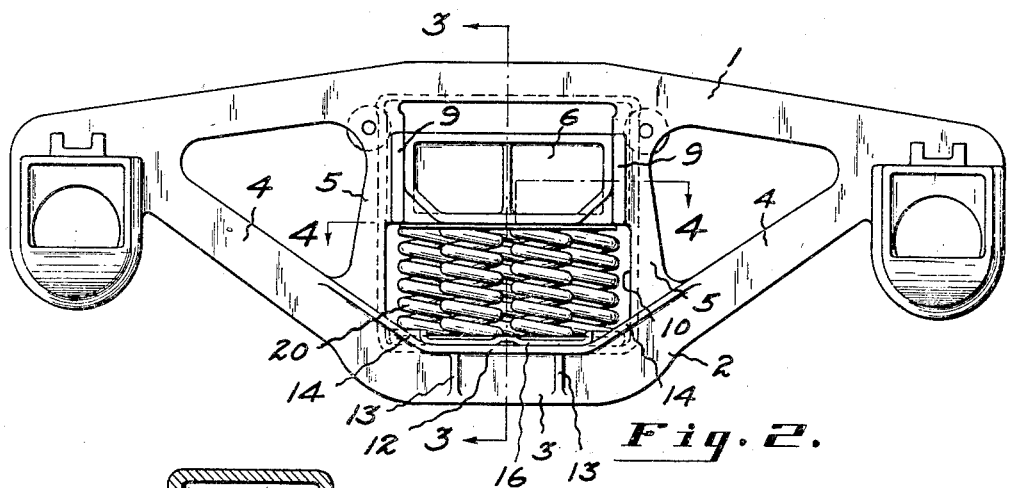
Fig. 2 is a side elevation of the assembly shown in Fig. 1.
Figure 3:
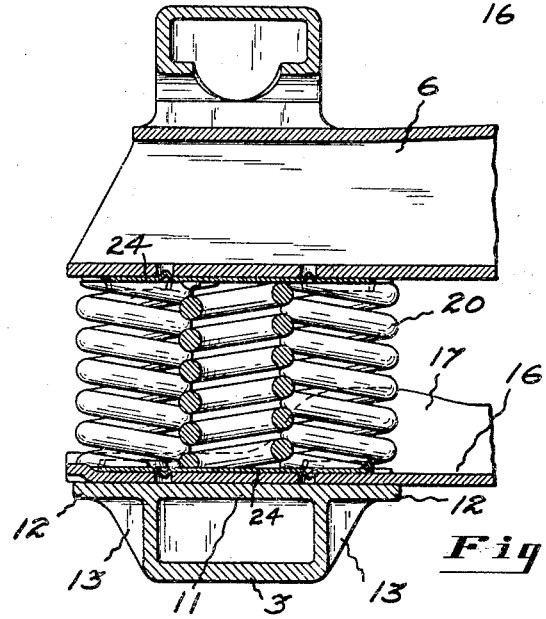
Fig. 3 is a vertical section taken on the line indicated at 3—3 in Fig. 2.

Either single or double coil springs may be employed and spring plates 24 such as shown in Figs. 2, 3 and 4 may be used if desired to permit the spring group to be inserted or removed as a unit.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. In a railway car truck, a side frame having an upper compression chord, a tension chord having a central horizontal portion and inclined end portions joining said central portion with the ends of the compression chord, upright columns extending from the ends of the horizontal portion to the compression chord and forming between them a bolster receiving opening, said horizontal portion having lateral flanges which are inclined upwardly from points spaced inwardly from the columns to strengthen the tension chord at the juncture of the horizontal portion with the inclined end portions, the top face of the horizontal portion extending to the base of the columns between the inclined portions of the flanges to provide spring receiving recesses adjacent the columns said columns having inner faces extending to the horizontal spring supporting portion and inwardly projecting flanges forming bolster guides.

2. In a railway car truck, a bolster having lateral projections adjacent the ends thereof, side frames, each having a compression chord, a tension chord, and spaced columns connecting said chords and providing a bolster receiving opening, said columns having inner faces spaced apart a distance sufficient to receive the ends of the bolster and having guide flanges projecting inwardly from the upper portions thereof and terminating a sufficient distance from the bottom of the opening to permit insertion of the bolster beneath them, said tension chord having a flat top surface extending from the inner face of one column to the inner face of the other and reinforcing webs above the flat top on opposite sides of the chord adjacent the columns, said webs being integral with the columns and merging into the inner faces thereof and a spring plank having spring seating portions at the ends thereof widened to fit in the spaces between the webs.

3. In a railway car truck, a bolster having lateral projections adjacent the ends thereof, side frames, each having a compression chord, a tension chord, and spaced columns connecting said chords and providing a bolster receiving opening, said columns having inner faces spaced apart a distance sufficient to receive the ends of the bolster and having guide flanges projecting inwardly from the upper portions thereof and terminating a sufficient distance from the bottom of the opening to permit insertion of the bolster beneath them, said tension chord having a flat top surface between the columns and reinforcing webs above the flat top on opposite sides of the chord adjacent the columns, and a channel shaped spring plank having end portions widened to fit between said webs, the widened end portions of said plank having relatively low side flanges.

4. A spring plank having a bottom and side flanges extending throughout the length thereof, said plank having adjacent each end thereof, portions wider than the balance of the spring plank, said side flanges being of reduced height at the widened end portions of the plank.

5. A spring plank having a bottom and side flanges extending throughout the length thereof, said plank having widened portions adapted to seat in the bolster openings of the side frame of a truck and ends which are narrower than said widened portions, said side flanges being of reduced height at the widened portion and ends thereof to facilitate insertion and removal of groups of bolster supporting springs.

In testimony whereof I affix my signature.

KARL M. HAMILTON.

DISCLAIMER 1,801,234.—*Karl M. Hamilton*, Chicago, Ill. RAILWAY-CAR TRUCK. Patent dated April 14, 1931. Disclaimer filed December 27, 1933, by the assignee, *The Bettendorf Company*.

Hereby enters this disclaimer to that part of claim 4 in the following words:
"Said plank having adjacent each end thereof, portions wider than the balance of the spring plank" except where the portions wider than the balance of the spring plank are disposed inwardly from the ends of the spring plank and the ends of the spring plank are narrower than said wider portions.

[*Official Gazette January 16, 1934.*]